G. W. SCHOFIELD.

Revolving Fire-Arms.

No. 8,354. Reissued July 30, 1878.

Witnesses,
L. Walter Fowler,
Chas. O. Gill

Inventor,
G. W. Schofield

N. PETERS, PHOTO-LITHOGRAPHER, WASHINGTON, D. C.

UNITED STATES PATENT OFFICE.

GEORGE W. SCHOFIELD, OF UNITED STATES ARMY.

IMPROVEMENT IN REVOLVING FIRE-ARMS.

Specification forming part of Letters Patent No. 193,620, dated July 31, 1877; Reissue No. 8,354, dated July 30, 1878; application filed July 6, 1878.

*To all whom it may concern:*

Be it known that I, GEORGE W. SCHOFIELD, of the United States Army, have invented new and useful Improvements in Revolving Fire-Arms, of which the following is a specification, reference being had to the accompanying drawings.

The invention relates to certain improvements in revolving fire-arms; and consists in the devices hereinafter fully described.

The objects of the invention are as follows: first, to provide a gas-collar that will prevent the gas and smoke from the discharge or other foreign matter from fouling the base-pin; second, to provide a non-corrosive base-pin with short bearings and a gas-recess; third, to provide an ejector-stud that will afford a reliable and efficient pivot for the cylinder; fourth, to provide means through all of the foregoing, in combination, to prevent clogging of the revolving cylinder by fouling, rust, or gas, or by its losing its rear bearing, or by any or all of these agencies; fifth, to supply upon the rear end of the barrel of the arm a pivoted or movable cylinder-stay and locking-shoulder, for the purpose hereinafter set forth.

Figure 1:
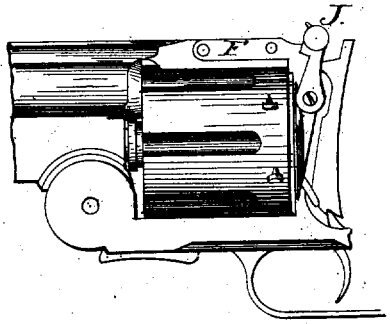
Figure 2:
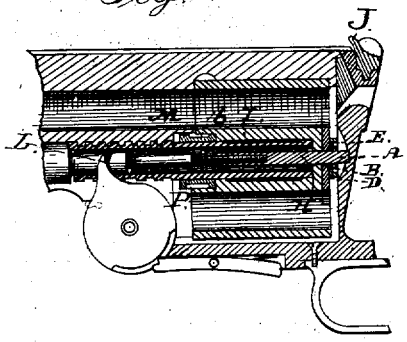
Figure 4:
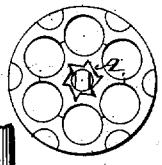
Figure 5:
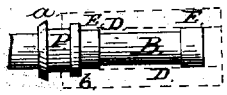
Figure 3:
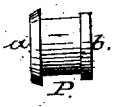
Figure 9:
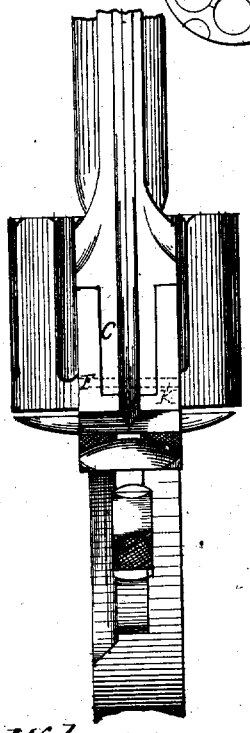
Figure 6:
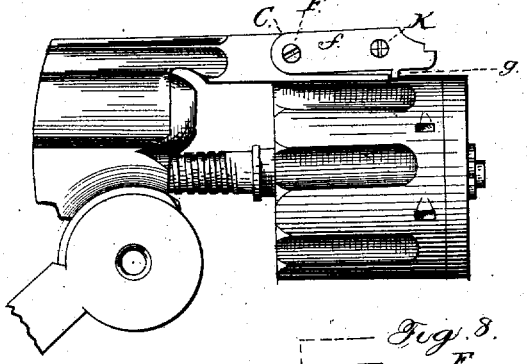
Figure 7:
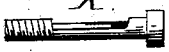
Figure 8:
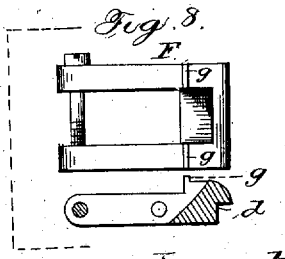

Figure 1 is a side elevation of a device embodying the elements of the invention. Fig. 2 is a central vertical longitudinal section of same. Fig. 3 is a detached view of the gas-collar. Fig. 4 is a front-end view of the cylinder and ejector-stud. Fig. 5 is a detached side elevation of the base-pin, with gas-collar in position. Fig. 6 is a side elevation, showing the pivoted cylinder-stay and locking-shoulder in its raised position and the cylinder partially withdrawn from the base-pin, illustrating the mode of removing the cylinder. Fig. 7 is a side view of the cam-screw K, showing a portion of one side cut away, which cut is of a length to correspond with the width of the solid portion of the barrel-extension between the arms of the cylinder-stay and locking-shoulder, as shown in Fig. 9, which serves to hold the hinged piece F firmly in position, as shown in Fig. 1, and when turned partially backward brings the cut-away portion of the cam-screw into such position as to permit the part F to move upon its hinge or pivot a distance sufficient to raise the lug *g* free of the cylinder, as shown in Fig. 6. Fig. 8 is a bottom view and a central vertical section of the hinged or pivoted cylinder-stay and locking-shoulder with its pivot or hinge in position and the cam-screw removed. Fig. 9 is a top view of the barrel-extension with the cylinder-stay and locking-shoulder in position, and showing between the arms of the latter the solid portion of this barrel-extension.

In the accompanying drawings, A represents the improved ejector-stud, to which is secured, at the rear end, the ejector-head, by means of a thread upon the stem of the stud. This improved form of stud has its head or bearing made very broad, thus affording a large surface, upon which the rear of the cylinder pivots, preventing its getting too much play by jamming the metal of the recoil-shield, in which the stud pivots, by repeated discharges of the arm, the sides or opposite sides of the stud being cut off square, so that it may be removed by means of a wrench.

The advantages secured by this invention may be stated to be as follows: Preventing the ejector-stud from losing its bearing, which, if lost, (as frequently happens in the methods now in use,) compels the cylinder to yield to the action of the hand when the hammer is retracted, causing the cylinder to tip, and thus bind on the base-pin at both ends.

B represents the base-pin, which is cut away for a portion of its length, providing thus the elongated recess D to retain any fouling matter and to reduce the surface exposed to friction and rust. This also provides the annular shoulders E, the rear one of which serves as the rear bearing for the cylinder, while the forward one receives the gas-collar hereinafter described, and which, when upon said shoulder, serves as the front and a movable bearing for the cylinder. As any rusting of the base-pin is very apt to bind the cylinder, it is made nickel-plated, and thus this invention affords a non-corrosive axis for the cylinder.

The ejector-stem H and spring I are contained within the hollow base-pin when the pin is in place in the cavity L, which is bored out in the center of the cylinder and provided at its front end with the annular recess M to receive the rear of the gas-collar P. The annular recess M is reamed to a larger diameter at its front end in order to give more space in which the gas may eddy, so as to prevent its reaching the base-pin.

The gas-collar is a hollow cylinder of non-corrosive metal, or may be of plated metal, of such construction and dimensions as to fit snugly upon the forward shoulder of the base-pin, the rear shoulder of the collar being of such circumference as to fit snugly in the recess M. It is therefore obvious that when the collar is in the said recess the entrance of smoke and gas into the cavity L, and the consequent fouling of the base-pin, will be effectually prevented. The gas-collar is constructed as aforesaid, and is provided at its front end with the annular shoulder *a*, having a slightly-backward bevel, and at its rear end with the annular shoulder *b*, the surface of which is parallel with the axis of the collar and somewhat less in length than the recess M in the cylinder, thus leaving a space in front of the shoulder *b*, even when the gas-collar is thrown forward by the discharge. The gas-collar, though fitting snugly upon the base-pin, as aforesaid, and also into the recess M, is made so as to slide readily upon the base-pin, and is rotated by or rotates with the cylinder, and when thrown forward by the discharge of the arm it closes the recess in front of it, entirely covering and protecting the forward shoulder of the base-pin, and yet leaves an annular space in the recess M in front of the shoulder *b*, within which the smoke and gas can eddy, and thus escape. Thus the cylinder is free to revolve, and yet the gas-collar shields its axis (the base-pin) from the corrosive and fouling action of gas and smoke, and should any fouling material enter the cavity L it will be retained in the recess of the base-pin and cause no obstruction to the revolving of the cylinder.

To the rear end of the barrel C is fitted the pivoted or movable cylinder-stay and locking-shoulder F. This cylinder-stay and locking-shoulder F consists of a suitable piece pivoted or hinged at F′ to the barrel-extension C. To retain the cylinder in position upon its stem, and to permit it to revolve freely thereon in using the arm, a lug, *g*, projects from the lower side of this pivoted piece F, extending over the edge of the cylinder, as represented in the drawings. Thus retained upon its stem the cylinder is free to revolve, and in opening the arm is still held in position longitudinally.

To retain the piece F (from the lower side of which projects the lug *g* to hold the cylinder upon its stem) firmly in position, and to release the same in order to remove the cylinder from its stem, a fastening device, K, is provided, which in this case is a cam-screw, and which passes through the piece F and the solid part of the barrel-extension, as shown in Fig. 9. To raise the pivoted piece F and release the cylinder, the cam-screw is given a part turn backward, by which the cut-away surface of the cam-screw is brought into such position as to permit the pivoted piece F to be moved on its pivot a distance sufficient to free the cylinder from the lug *g*, as represented in raised position in Fig. 6, thus permitting the cylinder to be removed from its stem.

On the rear end of the piece F, pivoted or hinged to the barrel-extension, is formed a convex locking-shoulder, *d*, on which shoulder takes, when the arm is closed and in position for firing, the barrel-latch J, as represented in Figs. 1 and 2. After the arm shall have been fired the latch J is drawn off the shoulder *d*, thus freeing the extended end of the barrel and permitting it to be partially revolved on its axis to eject the empty shells and to reload the chambers. After having reloaded the chambers in the cylinder the barrel is returned to its closed position, Fig. 1, in the act of which the barrel-latch passes over and upon the locking-shoulder *d* formed on the end of the pivoted piece F, thus rigidly securing the barrel in position the same as though the barrel and frame were in one piece or rigidly united and not hinged.

What I claim as my invention, and desire to secure by Letters Patent, is—

1. The ejector-stud A, having squared shoulders, so that it can be removed by means of a wrench, substantially as set forth.

2. A movable gas-collar having shoulders at each end, substantially as described and shown.

3. The movable gas-collar P, provided with the shoulders *a* and *b*, substantially as described and shown.

4. A recessed base-pin, in combination with a movable gas-collar and a recess, M, in the cylinder, substantially as set forth.

5. In revolving fire-arms, a pivoted or hinged cylinder-stay and locking-shoulder, substantially as herein set forth.

6. In revolving fire-arms, a pivoted or hinged cylinder-stay, forming the rear end of the barrel, substantially as described.

7. In revolving fire-arms, a pivoted or hinged cylinder-stay and cylinder-stay fastening device, substantially as shown and described.

G. W. SCHOFIELD.

Witnesses:

CHAS. C. GILL,

ROBT. H. PARKER.